United States Patent
Scherer et al.

(10) Patent No.: US 12,267,367 B2
(45) Date of Patent: *Apr. 1, 2025

(54) INTRUSION DETECTION AND PREVENTION SYSTEM RULE AUTOMATION AND OPTIMIZATION

(71) Applicant: TD Ameritrade IP Company, Inc., Omaha, NE (US)

(72) Inventors: Brandon William Scherer, Omaha, NE (US); John Scott Kula, Sinking Spring, PA (US)

(73) Assignee: Charles Schwab & Co., Inc, San Francisco, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 18/067,241

(22) Filed: Dec. 16, 2022

(65) Prior Publication Data
US 2023/0119649 A1    Apr. 20, 2023

Related U.S. Application Data

(63) Continuation of application No. 17/033,628, filed on Sep. 25, 2020, now Pat. No. 11,563,777.

(51) Int. Cl.
*H04L 9/40* (2022.01)

(52) U.S. Cl.
CPC .......... *H04L 63/20* (2013.01); *H04L 63/1433* (2013.01)

(58) Field of Classification Search
CPC .. H04L 63/20; H04L 63/1433; H04L 63/0263
USPC ............................................................ 726/1
See application file for complete search history.

(56) References Cited

U.S. PATENT DOCUMENTS

| | | | |
|---|---|---|---|
| 11,563,777 B2 * | 1/2023 | Scherer | H04L 63/20 |
| 2016/0323318 A1 * | 11/2016 | Terrill | H04L 63/1441 |
| 2018/0097775 A1 * | 4/2018 | Obaidi | H04L 63/0236 |

* cited by examiner

*Primary Examiner* — Noura Zoubair
*Assistant Examiner* — Aubrey H Wyszynski
(74) *Attorney, Agent, or Firm* — Harness, Dickey & Pierce, P.L.C.

(57) ABSTRACT

A network intrusion system for a protected network includes a ruleset module configured to receive metadata for rules. The metadata describes, for each of the rules, a set of associated network vulnerabilities. The ruleset module is configured to access vulnerability information describing a set of cumulative vulnerabilities that each is present in at least one network device within the protected network. The network intrusion system includes a rule management module configured to, for each rule of the plurality of rules: identify the set of associated network vulnerabilities described by the metadata for the rule, determine whether there is a match between any of the set of associated network vulnerabilities and the set of cumulative vulnerabilities, and, in response to determining that there is no match, transmit a first command signal to a network security module. The first command signal instructs the network security module to disable the rule.

20 Claims, 6 Drawing Sheets

INTRUSION DETECTION AND PREVENTION SYSTEM RULE AUTOMATION AND OPTIMIZATION

CROSS-REFERENCE TO RELATED APPLICATIONS

This application is a continuation of U.S. patent application Ser. No. 17/033,628, filed Sep. 25, 2020 (now U.S. Pat. No. 11,563,777). The entire disclosure of the above application is incorporated by reference.

FIELD

The present disclosure relates to systems and methods for managing network rules in a computer network, and more particularly to systems and methods for managing network attack detection and/or prevention rules that are applicable to the computer network.

BACKGROUND

Network security relies on various policies and rules to monitor and prevent unauthorized access to devices in a computer network. In some examples, the unauthorized access may lead to malicious attacks on the network. In many cases, the network security helps reduce the risk of data loss and disruption.

Typically, network security systems include a passive network security module such as an intrusion detection system (IDS) or an active network security module such as an intrusion prevention system (IPS) to monitor network traffic for suspicious and/or malicious activity, report the activity, and in some cases, attempt to block network traffic related to the activity. These actions are taken based on default rules provided by a variety of sources including, for example, an IDS/IPS vendor, an open-source repository, a threat-intelligence feed, etc. Generally, the default rules are based on the vendor's recommendation and criteria, taking into account generalized vulnerabilities, the criticality of the vulnerabilities, and recent activity against the vulnerabilities in the wild. This network security approach based on default rules may be referred to as a one-size-fits-all model.

The one-size-fits-all model produces large amounts of default rules pushed to the IDS/IPS to ensure various vulnerabilities spanning across numerous and different network security systems are covered. For example, the one-size-fits-all model commonly produces a ruleset having over 30,000 default rules. Additionally, periodic updates (e.g., weekly, monthly, etc.) may increase the ruleset by about 50 to 300 rules per update. As a result, the IDS/IPS generates millions of alerts per day (e.g., sometimes exceeding ten million alerts per day) based on the default rules, many of which may be false positives—that is, benign traffic, unremarkable scanning activity, or futile attacks. This requires numerous analysts to evaluate the alerts. For example, a single analyst may evaluate and process on average about twelve alerts per hour over an eight hour day. This may lead to overload conditions in the system, manpower, etc.

Analysts may be forced to strike a balance between the default ruleset and the overload conditions. As a result, network security systems assume greater risk and exposure to suspicious and/or malicious activity. Further, processing and storage resources of the IDS/IPS as well as logging and backup systems are stressed by the large volume of alerts.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A network intrusion system for a protected network includes a ruleset module configured to receive metadata for a plurality of rules. The metadata describes, for each rule of the plurality of rules, a set of associated network vulnerabilities. The ruleset module is configured to access vulnerability information describing a set of cumulative vulnerabilities that each is present in at least one of a plurality of network devices in the protected network. The network intrusion system includes a rule management module in communication with the ruleset module. The rule management module is configured to, for each rule of the plurality of rules: identify the set of associated network vulnerabilities described by the metadata for the rule, determine whether there is a match between any of the set of associated network vulnerabilities and the set of cumulative vulnerabilities, and, in response to determining that there is no match, transmit a first command signal to a network security module. The first command signal instructs the network security module to disable the rule.

In other features, the rule management module is further configured to, for each rule of the plurality of rules, in response to determining that there is a match between any of the set of associated network vulnerabilities and the set of cumulative vulnerabilities, transmit a second command signal to the network security module. The second command signal instructs the network security module to enable the rule.

In other features, the rule management module is configured to determine whether there is a match between any of the set of associated network vulnerabilities and the set of cumulative vulnerabilities by determining whether an intersection of the set of associated network vulnerabilities and the set of cumulative vulnerabilities is an empty set. The rule management module is configured to, in response to determining that the intersection is the empty set, transmit the first command signal to the network security module.

In other features, the network intrusion system includes the network security module. The network security module is configured to inspect network traffic to the protected network according to a subset of the plurality of rules. In other features, the network security module is configured to select the subset from the plurality of rules according to command signals received from the rule management module. In other features, the network security module is configured to remove from the subset rules corresponding to first command signals received from the rule management module.

In other features, the network security module is configured to receive a definition for each of the plurality of rules from a distribution server external to the protected network. In other features, the network security module is configured to receive a definition for each of the plurality of rules from a distribution server administered by a vendor of the network security module. In other features, the network security module includes at least one of an intrusion detection system (IDS) and an intrusion prevention systems (IPS).

In other features, the network intrusion system includes a management module configured to receive a first alert from the network security module indicating suspect network traffic; determine a source IP address associated with the suspect network traffic; in response to the source IP address being within the protected network, selectively transmit a second alert indicating a potential internal attack; and in response to the source IP address being external to the protected network, selectively transmit a third alert indicating a potential external attack.

In other features, the ruleset module is configured to receive definitions of the plurality of rules along with the metadata for the plurality of rules. The rule management module is configured to, for each rule of the plurality of rules, in response to determining that there is a match between any of the set of associated network vulnerabilities and the set of cumulative vulnerabilities, transmit the definition of the rule to the network security module.

In other features, the rule management module is configured to, receive a firewall policy associated with a firewall that is configured to control access to the protected network. The rule management module is configured to, for each rule of the plurality of rules, determine whether there is a match between any of the set of associated network vulnerabilities and the set of cumulative vulnerabilities. The rule management module is configured to, in response to determining that there is a match: determine affected devices from the plurality of network devices; determine a traffic signature of the rule; compare the traffic signature to the firewall policy; and in response to the firewall policy blocking traffic matching the traffic signature from reaching the affected devices, transmit the first command signal to the network security module.

In other features, the metadata for each of the plurality of rules specifies a severity. The rule management module is configured to, for each rule of the plurality of rules: compare the specified severity to a severity threshold and, in response to determining that the specified severity falls below the severity threshold, transmit the first command signal to the network security module. In other features, the network intrusion system includes a network assessment module configured to generate the vulnerability information. In other features, the network assessment module is configured to track software inventory of the protected network, including versions of software installed on each of the plurality of network devices. In other features, the network assessment module is configured to scan the plurality of network devices to identify versions of software installed on the plurality of network devices.

A method of operating a network intrusion system for a protected network includes receiving metadata for a plurality of rules. The metadata describes, for each rule of the plurality of rules, a set of associated network vulnerabilities. The method includes accessing vulnerability information describing a set of cumulative vulnerabilities that each is present in at least one of a plurality of network devices in the protected network. The method includes, for each rule of the plurality of rules: identifying the set of associated network vulnerabilities described by the metadata for the rule; determining whether there is a match between any of the set of associated network vulnerabilities and the set of cumulative vulnerabilities; and, in response to determining that there is no match, transmit a first command signal to a network security module. The first command signal instructs the network security module to disable the rule.

In other features, the method includes, for each rule of the plurality of rules: in response to determining that there is a match between any of the set of associated network vulnerabilities and the set of cumulative vulnerabilities, transmitting a second command signal to the network security module. The second command signal instructs the network security module to enable the rule.

In other features, the method includes, receiving a firewall policy associated with a firewall that is configured to control access to the protected network. The method includes, for each rule of the plurality of rules: determining whether there is a match between any of the set of associated network vulnerabilities and the set of cumulative vulnerabilities. The method includes, for each rule of the plurality of rules, in response to determining that there is a match: determining affected devices from the plurality of network devices; determining a traffic signature of the rule; comparing the traffic signature to the firewall policy; and in response to the firewall policy blocking traffic matching the traffic signature from reaching the affected devices, transmitting the first command signal to the network security module.

In other features, the metadata for each of the plurality of rules specifies a severity. The method includes, for each rule of the plurality of rules, comparing the specified severity to a severity threshold and, in response to determining that the specified severity falls below the severity threshold, transmitting the first command signal to the network security module.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
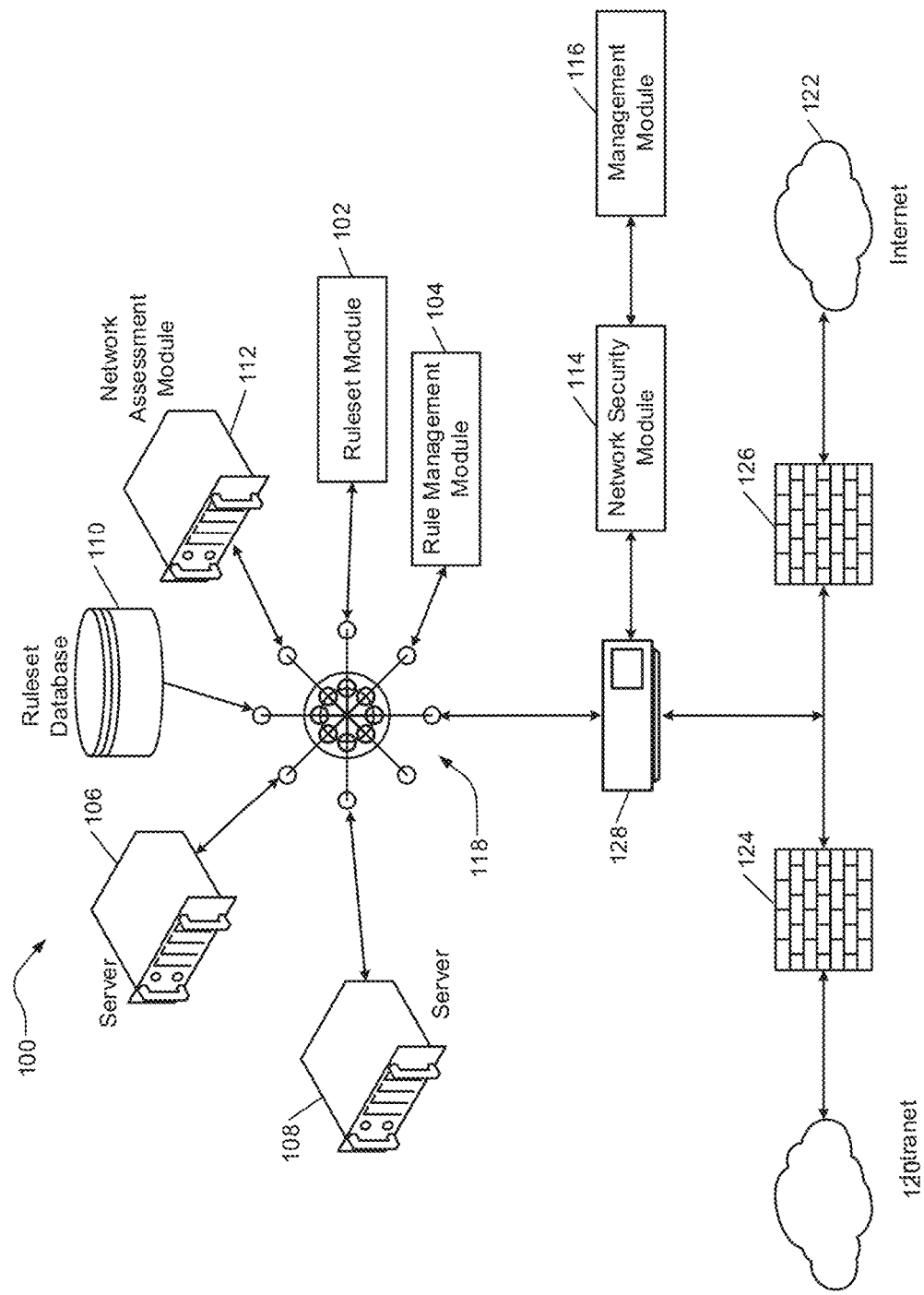
FIG. 1 is a functional block diagram of an example computer network environment for managing network rules, and including an intrusion detection system (IDS) according to the principles of the present disclosure.

The present disclosure describes a unique and customizable approach to managing rules used by network security modules in protected computer networks. As opposed to a conventional one-size-fits-all approach, the customizable approach described herein considers network vulnerabilities in specific network environments in which the network security modules are deployed when managing the rules. Due to its customizable features, this approach may be effectively employed in different protected networks. Additionally, evaluation of the network rules and consideration of the vulnerabilities in the network may be repeated as necessary if, for example, a vendor provides a new rule package including updated and/or new rules. The full set of rules may be received from the vendor, hand-created by an analyst, and/or from a third party, such as an open-source repository or threat subscription service.

From the full set of rules, whatever their origin, the customizable approach of this disclosure evaluates each rule for its relevancy and applicability to a specific protected network based on the vulnerabilities associated with network devices in that network. For example, the network rule management systems and methods disclosed herein may compare vulnerability descriptions associated with network rules received from vendors to device vulnerabilities in the network discovered by, for example, a network assessment module, and then enable particular network rules that match known vulnerabilities in the network. A network security module may then monitor the network based on the enabled rules. In various implementations, the active approach described here enables only the rules that are relevant and applicable to the vulnerabilities in a particular protected network, and disables the inapplicable (also referred to as non-matching) rules. As such, the rules relevant and applicable to the vulnerabilities in the particular network may be enabled, and employed by the network security module deployed in that network. This active system provides improved reliability and accuracy of vulnerability data as compared to a passive network system, which often provides unreliable and inaccurate data when relying on default rules.

By enabling rules that are applicable to device vulnerabilities in the protected network, the amount of rules evaluated by the network security module may be greatly reduced as compared to a conventional one-size-fits-all approach. As a result, hardware and/or software requirements associated with the network security module evaluating the rules may be reduced.

Additionally, alerts generated by the network security module based on the enabled rules may be reduced by orders of magnitude as compared to a conventional one-size-fits-all approach. For example, the network security module may generate 1,000-2,000 alerts per day, and sometimes fewer than 100 alerts per day, when the customizable approach disclosed herein is employed. This is significantly less than conventional one-size-fits-all approaches which can generate millions of alerts per day. As a result, analysts are provided a manageable amount of alerts, fewer false positives, and higher quality (e.g. more relevant) alerts as compared to alerts produced in a conventional one-size-fits-all approach. In turn, costs are minimized by reducing man hours and/or machine time spent investigating false positive alerts.

FIG. 1 depicts a network intrusion system 100 for a protected network. The network intrusion system 100 may include a ruleset module 102, a rule management module 104, one or more network devices (e.g., servers 106, 108), a ruleset database 110, a network assessment module 112, a network security module 114, and a management module 116. As shown in FIG. 1, the ruleset module 102, the rule management module 104, the servers 106, 108, the ruleset database 110, the network assessment module 112, the network security module 114, and the management module 116 may be in communication with each other via a protected network 118 such as a demilitarized zone (DMZ) network. The servers 106, 108 and/or other possible network devices in the network intrusion system 100 may be exposed to internal and/or external networks such as an intranet 120 and/or the internet 122 via firewalls 124, 126 and a networking component 128 (e.g., a router, a switch, etc.).

The ruleset module 102 may receive information relating to network rules and/or vulnerabilities. For example, the ruleset module 102 may receive metadata for the rules. This metadata may, for example, describe a set of associated network vulnerabilities for each of the rules. The metadata may be optionally stored in the ruleset database 110 or another suitable location, and then provided to the ruleset module 102. In other examples, the metadata may be received by the ruleset module 102 without being previously stored in the protected network 118. In some examples, a distribution server (e.g., administered by a network security vendor, etc.) external to the protected network 118 may push the metadata the ruleset database 110 and/or the ruleset module 102. This may occur periodically (e.g., weekly, monthly, etc.), randomly, in response to newly discovered threats, etc.

Additionally, the ruleset module 102 may access vulnerability information related to the protected network 118. For example, the ruleset module 102 may access vulnerability information describing a set of cumulative vulnerabilities that is each present in one or more of the servers 106, 108 and/or other possible network devices in the protected network 118. In some examples, the network assessment module 112 may generate the vulnerability information describing the vulnerabilities present in at least one of the network devices. In such examples, the network assessment module 112 may identify any network devices, particular ports of the network devices, etc. that are vulnerable. The vulnerability information may be optionally stored in a database such as a network assessment database, and then accessed by the ruleset module 102 as desired. The network assessment module 112 may include any suitable vulnerability scanner or the like.

The rule management module 104 may evaluate each rule of the received rules and determine whether the rule is applicable to the protected network 118. For example, the rule management module 104 may identify the set of associated network vulnerabilities described by the received metadata for each rule, and then evaluate the set of associated network vulnerabilities and the set of cumulative vulnerabilities. For instance, once the set of associated network vulnerabilities is identified, the rule management module 104 may determine whether a match exists between any of the set of associated network vulnerabilities and the set of cumulative vulnerabilities. The rule management module 104 may determine whether a match exists in any suitable manner. For example, the rule management module 104 may determine whether an intersection of the set of associated network vulnerabilities and the set of cumulative vulnerabilities is an empty set (e.g., a null set). In such examples, descriptions related to vulnerabilities in the set of associated network vulnerabilities may be intersected (e.g., compared) with descriptions related to vulnerabilities in the set of cumulative vulnerabilities. If the sets do not contain a common vulnerability description, the intersection may be an empty set.

Additionally, the rule management module 104 evaluate each rule for its applicability based on one or more defined policies. For example, the defined policies may include a firewall policy, a severity policy, etc. As further explained herein, a rule of the ruleset may be deemed applicable if a firewall policy leaves a particular network device (e.g., the server 106, a port of the server 108, etc.) exposed, a severity value (e.g., a common vulnerability scoring system (CVSS) score, etc.) of a network vulnerability associated with the rule is above a defined threshold, etc. If, however, the firewall policy does not leave the network device exposed and/or the severity value is below the defined threshold, the selected rule may be deemed inapplicable.

Additionally, the rule management module 104 may evaluate each rule of the ruleset. As such, each rule may be evaluated by the rule management module 104 to determine whether that rule is applicable based on network configurations and whether any network device matches a vulnerability description of the rule. Additionally, the evaluation of each rule may be reoccurring (e.g., repeated) based on, for example, when a new ruleset is pushed out, a new vulnerability assessment is available, etc. In some examples, each rule may be evaluated daily, weekly, monthly, etc.

The rule management module 104 may then notify the network security module 114 of the network vulnerability associated with the rule whether, for example, the rule is applicable and/or the at least one network device is vulnerable to the network vulnerability associated with the selected rule. Notification of the network vulnerability may be accomplished in various suitable manners. For example, the rule management module 104 may transmit a command signal to the network security module 114 instructing the network security module 114 to enable the rule in response to determining a match between any of the set of associated network vulnerabilities (e.g., associated with the rule) and the set of cumulative vulnerabilities. The network security module 114 may enable the rule in response to receiving this command signal.

Additionally and/or alternatively, the rule management module 104 may transmit a command signal to the network security module 114 instructing the network security module 114 to disable the rule in response to determining a match does not exist between any of the set of associated network vulnerabilities (e.g., associated with the rule) and the set of cumulative vulnerabilities. In such examples, the network security module 114 may disable the rule in response to receiving this command signal. In such examples, the disabled rules may not be relied on by the network security module 114 when monitoring traffic. In other embodiments, the rule management module 104 may disable a particular rule by not passing the rule, instructions for taking action on the rule, etc. to the network security module 114.

In some examples, the rule management module 104 may transmit only the command signal(s) for disabling the rule(s) to the network security module 114 and/or the network security module 114 may disable only the selected rule (or rules). As such, the network security module 114 may not receive a command signal instructing the network security module 114 to enable a particular rule. In such examples, all rules that have not been disabled may be used by the network security module 114.

Additionally, the network security module 114 may enable and/or disable rules for the entire network environment. This may occur even if only one network device is exposed to a particular vulnerability. In other embodiments, the network security module 114 may enable and/or disable rules on a per IP destination basis. This may focus the rule management to a particular network device if only that device is exposed to a vulnerability.

In some examples, the network security module 114 and/or the ruleset module 102 may receive definitions for the rules. If the ruleset module 102 receives the definitions, the ruleset module 102 may transmit the definitions of the rules to the network security module 114 in response to determining a match exists between any of the set of associated network vulnerabilities and the set of cumulative vulnerabilities as explained above. The definitions may be provided by, for example, a distribution server external to the protected network 118, a distribution server administered by a vendor of the network security module 114, etc. The definitions may specify, for example, descriptions of network vulnerabilities associated with the rules, conditions in which triggers an action, etc.

The network security module 114 may inspect (e.g., monitor) the protected network 118 to detect possible malicious network traffic based on the network vulnerabilities (e.g., the definitions) associated with the enabled rules. For example, the network security module 114 may rely on the enabled rules to detect possible malicious network traffic. In such examples, the network security module 114 may inspect network traffic to the protected network 118 according to a subset of the rules. The subset may be selected by the network security module 114 according to the command signals received from the rule management module 104. For instance, the network security module 114 may remove the rules from the subset corresponding to received disabling command signals, as explained above.

The network security module 114 may include any suitable detection and/or prevention system such as an IDS, an IPS, a next-generation firewall (NGFW), etc. In the particular embodiment of FIG. 1, the network security module 114 is an IDS.

In some examples, the management module 116 may determine characteristics of the possible malicious network traffic. For example, the management module 116 may receive an alert trigger from the network security module 114, and then determine a source IP address associated with the possible malicious (e.g., suspect) network traffic. Once the source IP address is identified, the management module 116 may transmit an alert indicating the source IP address (e.g., an external source or an internal source) and/or other characteristics of the possible malicious network traffic, as further explained herein. The management module 116 may transmit the alert to, for example, a user device (e.g., a network analyst's computing device, etc.), a database for future evaluation, etc.

The management module 116 may include any suitable security management system such as a security information management (SIM) system and/or a security event management (SEM) system. For example, the management module 116 of FIG. 1 may include a security information and event management (SIEM) system.

Figure 2:
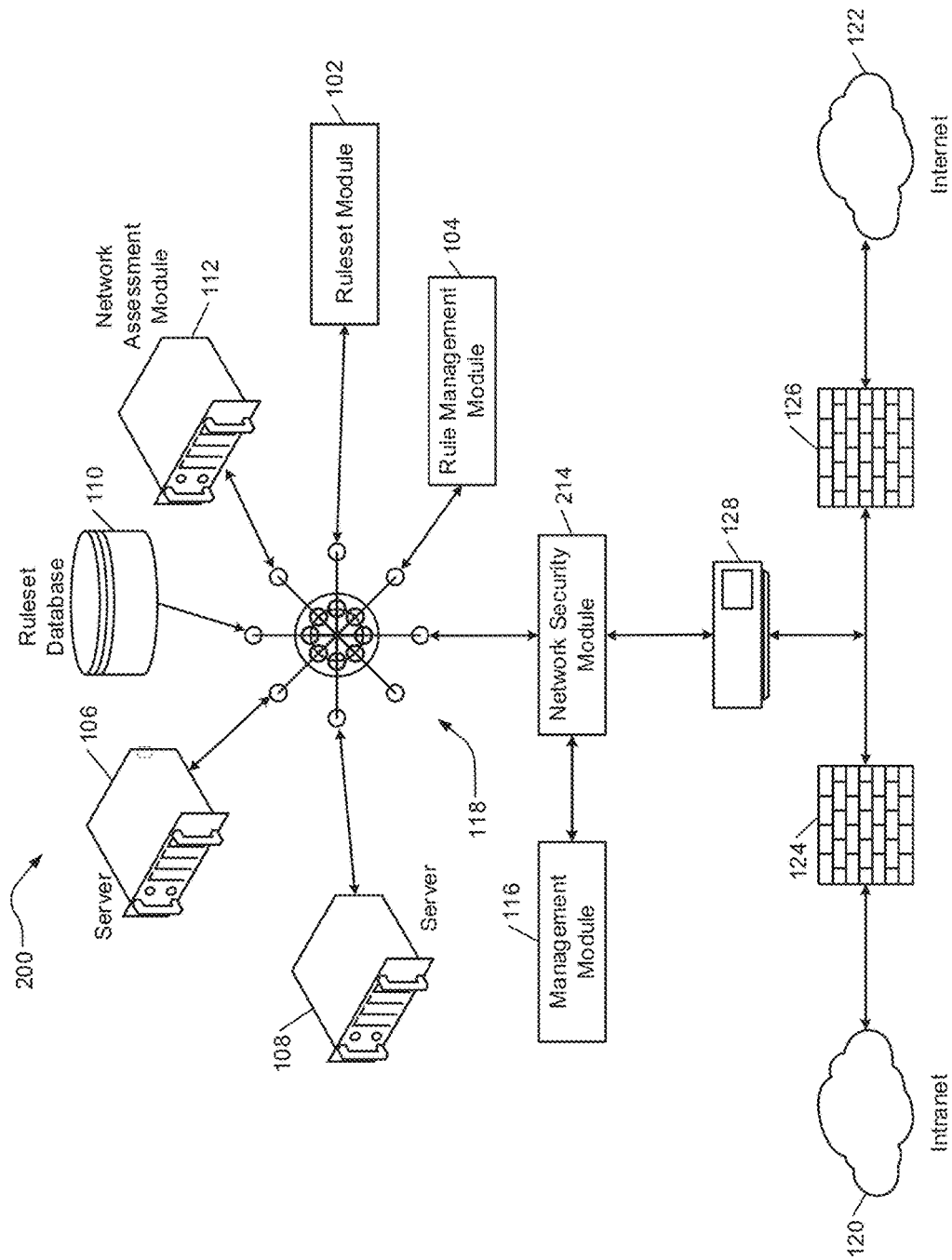
FIG. 2 is a functional block diagram of an example computer network environment for managing network rules, and including an intrusion prevention system (IPS) according to the principles of the present disclosure.

In some examples, one or more modules shown in FIG. 1 may be replaced with other suitable modules. For example, in FIG. 2, another network rule management system 200 is shown. In the embodiment of FIG. 2, the network rule management system 200 is substantially similar to the network intrusion system 100 of FIG. 1, but includes a different network security module. For example, in FIG. 2, the network rule management system 200 includes a network security module 214 positioned in the communication path (e.g. in-line) of any traffic attempting access to the protected network 118. The network security module 214 may include any suitable detection and/or prevention system such as an IDS, an IPS, etc. In the particular embodiment of FIG. 2, the network security module 214 is an IPS, which may sometimes be referred to as an intrusion detection and prevention system (IDPS). The remaining components, modules, etc. shown in FIG. 2 may function in a similar manner as the corresponding components, modules, etc. shown in FIG. 1.

Figure 3:
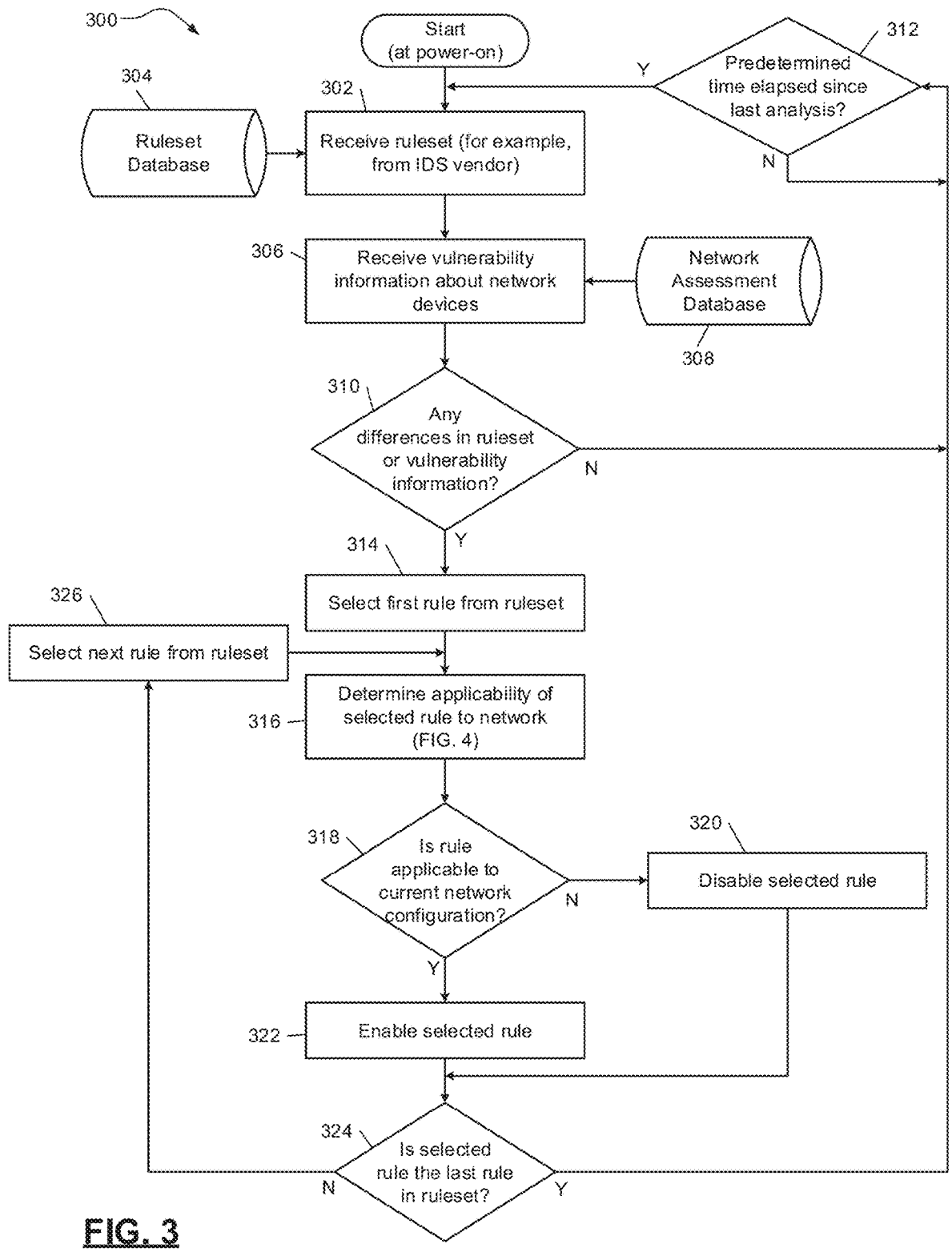
FIG. 3 is a flowchart depicting an example rule evaluation process for determining whether to enable network rules according to the principles of the present disclosure.

In FIG. 3, an example rule evaluation process 300 performed by a ruleset module and a rule management module such as the ruleset module 102 and the rule management module 104 of FIGS. 1 and 2 is depicted. As shown, the rule evaluation process 300 may start at power-on of the ruleset module and the rule management module. In other examples, the evaluation process 300 may start at another suitable time after power-on.

The evaluation process 300 begins at 302 where a ruleset is received from a vender (e.g., an IDS or IPS vendor) via a ruleset database 304. The ruleset may be provided as metadata describing, for rules in the ruleset, a set of associated network vulnerabilities, as explained above. At 306, vulnerability information about network devices is received and accessed. The vulnerability information describes a set of cumulative vulnerabilities present in network devices in a protected network from a network assessment module via a network assessment database 308. Although FIG. 3 shows the ruleset as being received before the vulnerability information, it should be apparent to those skilled in the art that the vulnerability information may be received before or at the same time as the ruleset if desired.

For example, an IDS vendor may push a rule update package including metadata associated with rules for various common vulnerabilities and exposures (CVEs). The CVEs may include, for example, CVE-2020-0100, CVE-2020-0200, CVE-2020-0300, and CVE-2020-0400. Additionally, the network assessment module may scan the network for devices that are vulnerable to CVEs provided in the rule update package. For example, the network assessment module may scan the network to identify devices vulnerable to CVE-2020-0100, CVE-2020-0200, CVE-2020-0300, and CVE-2020-0400.

At 310, a comparison may be made between the current ruleset and vulnerability information and a previous ruleset and vulnerability information. If no differences are identifies between the current and previous data, the process 300 may return and proceed to 312. For example, at 312, the process 300 may determine if a predetermined amount of time has elapsed since the last analysis of the ruleset and vulnerability information (in 310). If not enough time has elapsed, the processor may return to determining if a predetermined time has elapsed (e.g., after waiting a period of time). However, if enough time has elapsed, the process 300 may return to receiving the ruleset at 302 and vulnerability information at 306.

If differences are identifies between the current and previous ruleset and vulnerability information in 310, the process 300 proceeds to 314. At 314, a first rule of the ruleset is selected. At 316, the selected rule is evaluated (e.g., by the rule management module) to determine its applicability to the protected network. For example, the applicability of the selected rule may be determined based on defined network configurations such as one or more firewall policies, severity policies, and/or whether any network device matches a network vulnerability (e.g., a vulnerability description) associated with the selected rule, as explained herein. If the first selected rule is deemed inapplicable at 318, the first selected rule is disabled at 320. If the first selected rule is deemed applicable at 318, the first selected rule is enabled at 322.

The enablement or disablement of each rule from the ruleset at 320, 322 may be performed by a network security module (e.g., the network security module 114 of FIG. 1, the network security module 214 of FIG. 2, etc.) as explained above. For example, the rule management module may transmit command signals to the network security module instructing the network security module to enable or disable selected rules based on their applicability.

After the selected rule is enabled (at 322) or disabled (at 320), the process 300 determines if the selected rule is the last rule in the ruleset at 324. If no, the process 300 selects the next rule (e.g., a second rule) from the ruleset at 326, and returns to determine the next rule's applicability at 316. If the selected rule is the last rule in the ruleset at 324, the process 300 returns to 312 to determine if a predetermined amount of time has elapsed since the last ruleset analysis. The applicability of each selected rule may be determined (at 316 of FIG. 3) in any suitable manner. For example, in FIG. 4, an example rule applicability process 400 performed by a rule management module such as the rule management module 104 of FIGS. 1 and 2 is depicted. The rule applicability process 400 may begin at 402 where a severity value policy may be implemented. For example, a severity of vulnerability (e.g., a severity value) related to the selected rule (e.g., the first rule selected at 314 of FIG. 3, the next rule selected at 326 of FIG. 3, etc.) may be identified at 402. In some embodiments, the metadata associated with the rules may specify the severity. The severity of vulnerability may include, for example, a CVSS score.

At 404, the identified severity of vulnerability for each rule is compared to a severity threshold. If the severity of vulnerability is less than (e.g., falls below) the severity threshold, the selected rule may be identified as not applicable in 406. In other words, the severity of vulnerability may have a particular CVSS score indicating the network vulnerability is a low risk. As a result, the selected rule may be disabled in 320 of FIG. 3, as explained above. In such examples, the rule management module may transmit a command signal to the network security module instructing the network security module to disable the selected rule, as explained above.

If the severity of vulnerability is greater than the predetermined threshold in 404 (e.g., indicating the particular network vulnerability is a high risk, etc.), the process 400 may proceed to 408.

The severity threshold may be any suitable predetermined value based on, for example, an acceptable level of risk tolerable in the network. For example, if the severity of vulnerability is a CVSS score ranging from 0 to 10, the predetermined threshold may be 3.9, 4.0, 5.0, 6.9, 7.0, etc.

Figure 4:
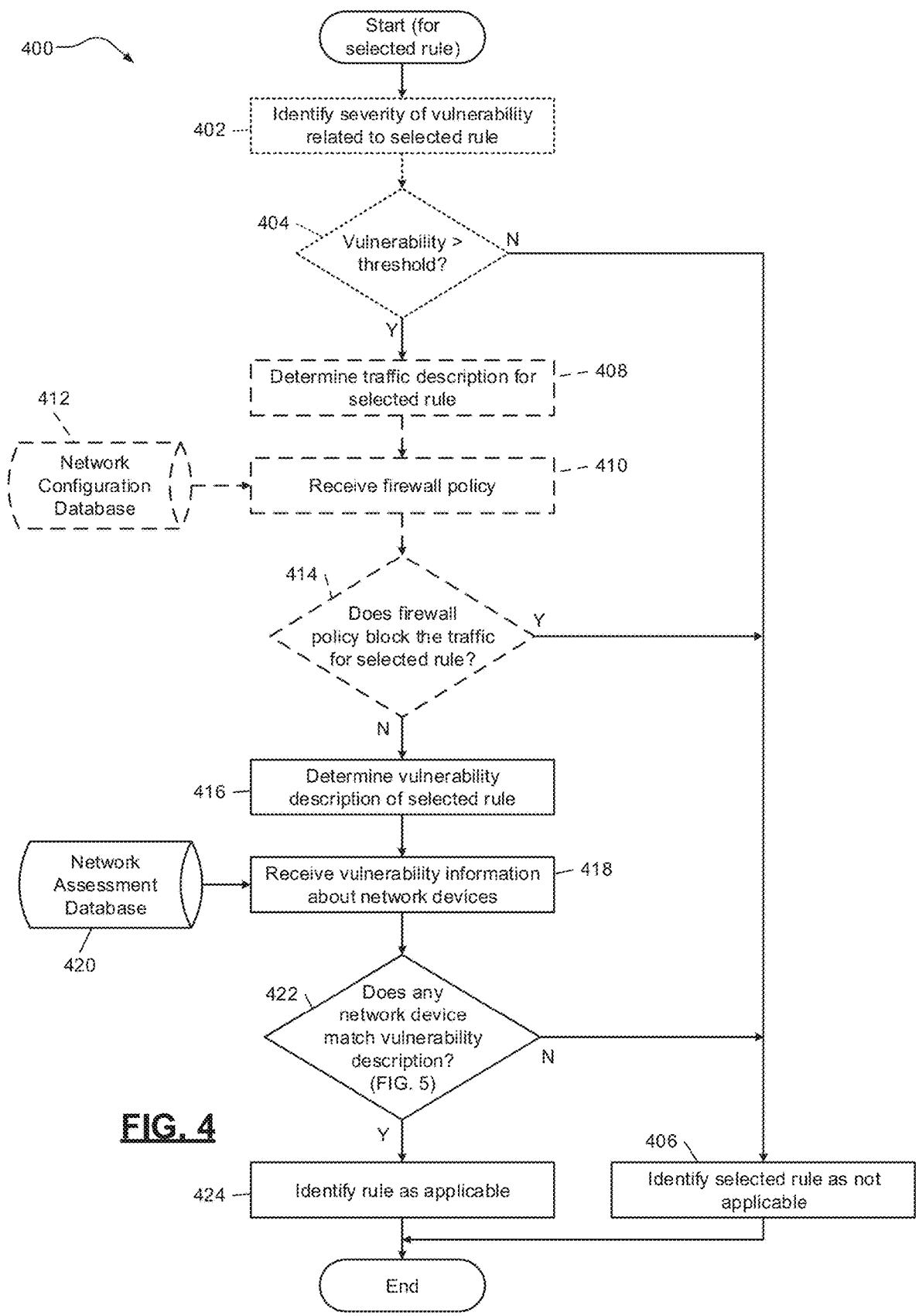
FIG. 4 is a flowchart depicting an example rule applicability process for determining whether network rules are applicable to a network according to the principles of the present disclosure.

At 408, a firewall policy may be implemented. Specifically, at 408, a traffic description (e.g. signature) for the selected rule may be determined. For example, the traffic description may identify the CVE associated with the selected rule. After the traffic description is determined in 408, at least one firewall policy associated with a firewall that controls access to the protected network may be received (e.g., by the rule management module 104) at 410. As shown in FIG. 4, the firewall policy may be transmitted by a network configuration database 412. For example, the firewall policy may permit communication between a port of a network device (e.g., port 80 of the server 106 of FIGS. 1 and 2) if the traffic is coming from a private IP address, and block communication between the port of the network device (e.g., port 80 of the server 106 of FIGS. 1 and 2) if the traffic is coming from a public IP address. In some examples, the firewall policy may block all traffic to a particular port of the network device regardless of the source IP address.

After the firewall policy is received in 410, the process 400 determines whether the firewall policy blocks traffic for the selected rule in 414. For example, the traffic signature for the selected rule may be compared to the firewall policy to determine whether the firewall policy blocks traffic for the selected rule. If the firewall policy blocks traffic matching the traffic signature from reaching affected (e.g., vulnerable) network devices, the rule may be identified as not applicable in 406. As a result, the selected rule may be disabled in 320 of FIG. 3. In such examples, the rule management module may transmit a command signal to the network security module instructing the network security module to disable the selected rule, as explained above.

If the firewall policy permits traffic for the selected rule, the process 400 may proceed to 416. For example, the firewall policy may permit traffic to port 80 of the server 106 coming from a private IP address, block traffic to port 80 of the server 106 coming from a public IP address, and block all traffic to port 22 of the server 108. In this example, if port 22 server 108 is vulnerable to a CVE (e.g., the CVE-2020-0400 referenced above) of the selected rule, the rule management module may identify the selected rule as inapplicable because the firewall policy blocks all traffic to port 22 of the server 108. However, if port 80 of the server 106 is vulnerable to another CVE (e.g., the CVE-2020-0300 referenced above) of the selected rule, the process 400 may proceed to 416 because the firewall policy permits some traffic (e.g., from a private IP address) to the port 80 of the server 106.

At 416 a description for network vulnerabilities (e.g., CVEs) of the selected rule is determined and at 418 vulnerability information describing vulnerabilities present in network devices is received. In some examples, the vulnerability information may be received from a vulnerability assessment database 420. The vulnerability information may be generated by, for example, a network assessment module such as the network assessment module 112 of FIGS. 1 and 2. For example, the vulnerability information may indicate that no network devices are vulnerable to CVE-2020-0100 and CVE-2020-0200, port 80 of the server 106 is vulnerable to CVE-2020-0300, and port 22 of the server 108 is vulnerable to CVE-2020-0400.

After the description for the network vulnerabilities is determined in 416 and the vulnerability information is received 418, the process 400 determines if any vulnerability present in a network device matches the description of the network vulnerabilities in 422. If no, the selected rule is identified as inapplicable in 406, and the selected rule may be disabled in 320 of FIG. 3, as explained above. If yes, the selected rule is identified as applicable in 424, and the selected rule may be enabled in 322 of FIG. 3. For example, if the selected rule is for CVE-2020-0100, the selected rule is identified as inapplicable because no network device is vulnerable to CVE-2020-0100. As such, vulnerabilities of the network devices do not match CVE-2020-0100 of the selected rule. If, however, the selected rule is for CVE-2020-0300, the selected rule is identified as applicable because the server 106 (e.g., at port 80) is vulnerable to CVE-2020-0300. Thus, the vulnerability of the server 106 matches CVE-2020-0300 of the selected rule.

In some examples, the severity value policy and/or the firewall policy may be optional features in the process 400 of FIG. 4. For example, the severity value policy implementation at 402, 404 is shown in phantom lines, and the firewall policy implementation at 408, 410, 412, 414 is shown in phantom lines. For instance, in some embodiments, an applicability process may include implementation of the severity value policy, but not the firewall policy. In other embodiments, an applicability process may include implementation of the firewall policy, but not the severity value policy. In still other embodiments, an applicability process may not include either policy. In such embodiments, the applicability process may begin at 416.

Additionally, FIG. 4 shows implementation of the severity value policy, the firewall policy, and the network device/vulnerability description match determination as serial (e.g., in-line) steps. In other embodiments, any two or more of the severity value policy, the firewall policy, and the network device/vulnerability description match determination may be implemented in a parallel configuration. For example, the severity value policy and the firewall policy may be implemented in parallel. In such examples, a logic component (e.g., an AND gate, etc.) may receive results from the severity value policy and the firewall policy, and output an identifier to designate the selected rule as inapplicable or applicable.

The determination of whether any network device matches the vulnerability description of the selected rule in 422 of FIG. 4 may be implemented in any suitable manner. For example, in FIG. 5, an example match determination process 500 is depicted. In some examples, at least a portion of the match determination process 500 may be performed by a rule management module such as the rule management module 104 of FIGS. 1 and 2.

The match determination process 500 may begin at 502 where a determination is made as to whether the description for the network vulnerabilities implicates firmware associated with the network. If yes at 502, particular network devices with affected versions of the firmware are identified at 504. If no at 502, the process 500 proceeds to 506 where a determination is made as to whether the description of the network vulnerabilities implicates hardware associated with the network. If yes at 506, particular network devices with affected versions of the hardware are identified at 508. If no at 506, the process 500 proceeds to 510 where a determination is made as to whether the description of the network vulnerabilities implicates software associated with the network. If yes at 510, particular network devices with affected versions of the software are identified at 512. If no at 510, the process 500 proceeds to 514 to declare a no match condition between any network device and the vulnerability description of the selected rule. As a result, the selected rule may be identified as inapplicable in 406 of FIG. 4, and disabled in 320 of FIG. 3, as explained above.

In some embodiments, a network assessment module (e.g., the network assessment module 112 of FIGS. 1 and 2) may be used to monitor and/or identify the firmware, the hardware, and/or the software associated with the network. For example, the network assessment module may track software inventory of the protected network, including versions of software installed on each of the network devices. Additionally and/or alternatively, the network assessment module may scan the network devices to identify versions of software installed on the devices.

At 516, 518, 520, a determination is made as to whether any network device is identified in 504, 508, 512, respectively. If no at 516, the process 500 proceeds to 506 for the implicated hardware determination. If no at 518, the process 500 proceeds to 510 to the implicated software determination. If no at 520, the process 500 proceeds to 514 to declare a no match condition as explained above.

If, however, any network device affected with versions of firmware, hardware, or software is identified at 516, 518, 520, the process 500 proceeds to 522. At 522, a determination is made to whether the vulnerability of the network device is limited to a port or interface. If no at 522, the process 500 proceeds to 524 to declare a match condition between at least one of the network devices and the vulnerability description of the selected rule. As a result, the selected rule may be identified as applicable in 424 of FIG. 4, and enabled in 322 of FIG. 3, as explained above.

If the vulnerability of the network device is limited to a port or interface in 522, the process 500 proceeds to 526 where a determination is made as to whether the port or interface is open. If the port or interface is open, the process 500 proceeds to 524 to declare a match condition as explained above. If the port or interface is not open (e.g., closed), the process 500 proceeds to 514 to declare a no match condition as explained above.

Figure 5:
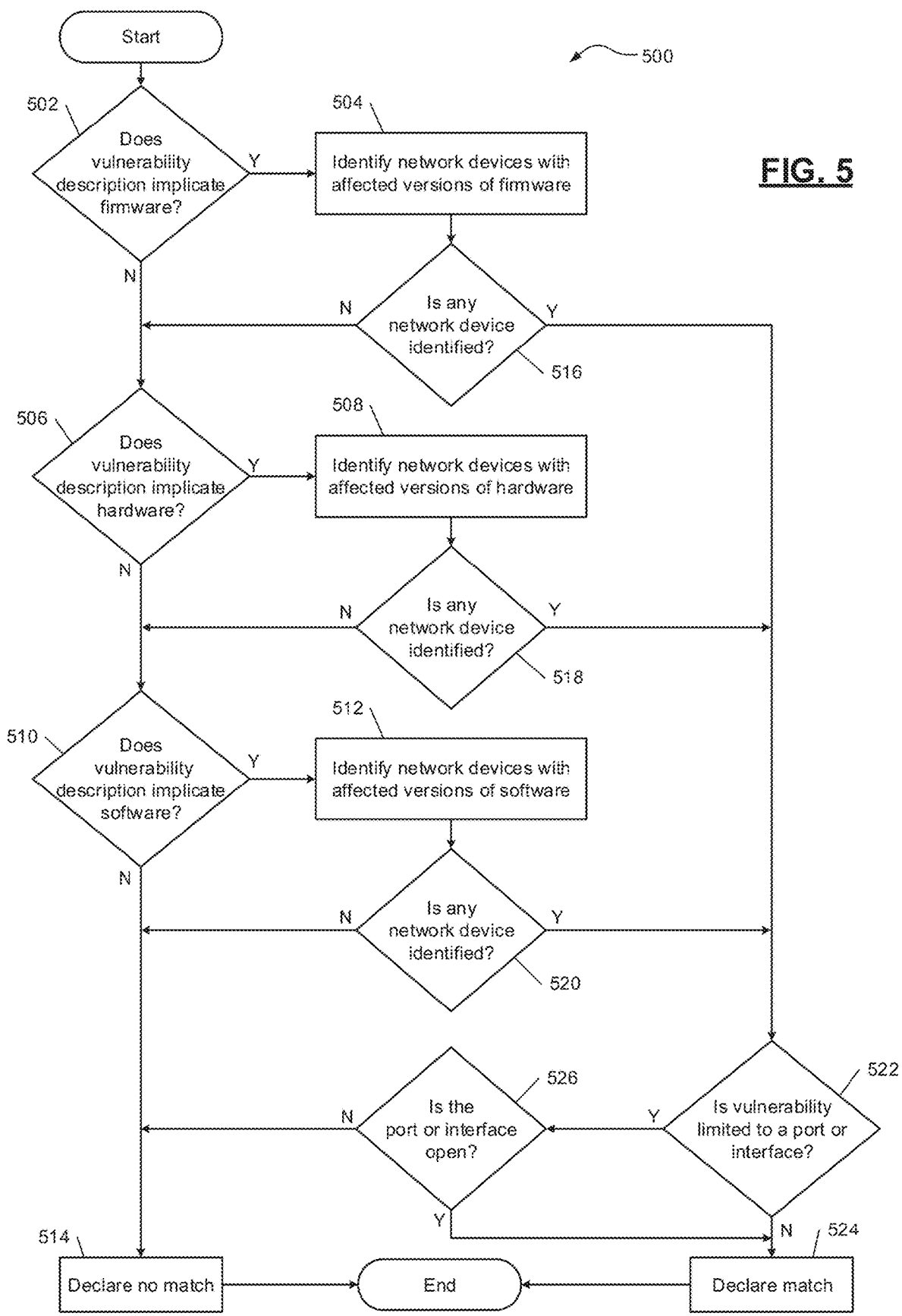
FIG. 5 is a flowchart depicting an example matching process for determining whether vulnerabilities of network devices match vulnerabilities associated with network rules according to the principles of the present disclosure.

Although FIG. 5 shows the implicated firmware, hardware, and software determinations in a particular order, it should be apparent to those skilled in the art that the determinations may be performed in another suitable order, or at the same time (e.g. a parallel configuration) as the ruleset if desired.

Figure 6:
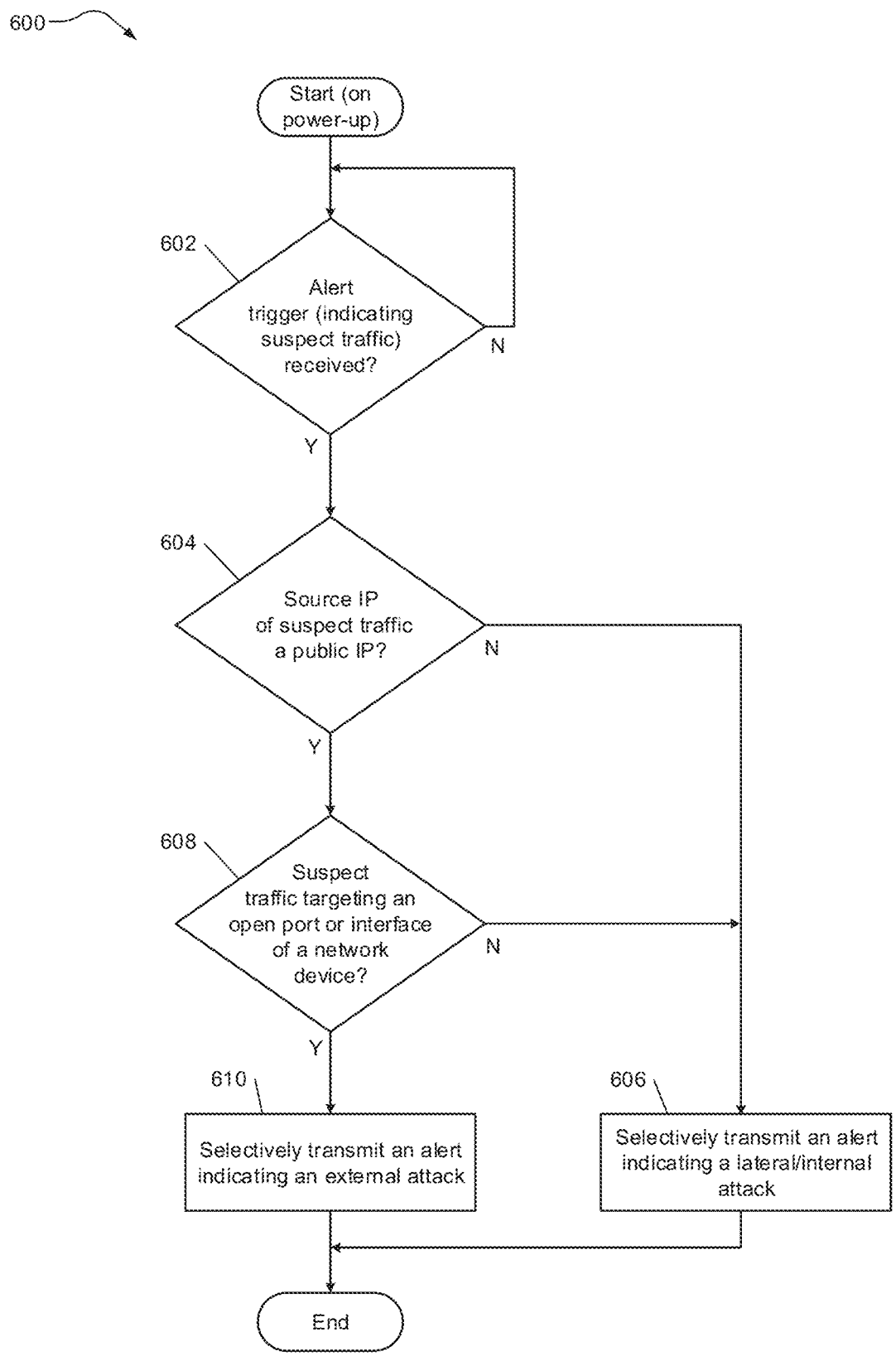
FIG. 6 is a flowchart depicting an example alert process for identifying a possible malicious traffic as an internal attack or an external attack according to the principles of the present disclosure.

In some examples, an alert may be generated to notify an analysts of a possible malicious network traffic. For example, in FIG. 6, an example alert process 600 performed by a management module such as the management module 116 of FIGS. 1 and 2 is depicted. The alert process 600 of FIG. 6 may start at power-on of the management module, or at another suitable time after power-on.

The alert process 600 begins at 602 where the management module determines whether an alert is received. The alert may indicate, for example, suspect (e.g., possible malicious) traffic in the network. For example, the alert may indicate, possible malicious traffic associated with a particular CVE (e.g., CVE-2020-0300 referenced above), a source IP address (e.g., 192.168.1.2, 11.12.13.14, etc.) of the attack, and a possible destination point (e.g., port 80 of the server 106 in FIGS. 1 and 2) for the attack.

If no alert is received at 602, the process 600 returns to 602. If an alert is received, the process 600 proceeds to 604. At 604, the management module determines a source IP address associated with the suspect network traffic, and whether the source IP address of the possible malicious traffic is a public IP address. For example, the management module may determine the source IP address as being within or external to the protected network. If the source IP address is external to the protected network, the source IP address may be identified as a public IP address. If, however, the source IP address is within the protected network, the source IP address may be identified as an internal (e.g., private IP address associated with the protected network. If the source IP address is not a public IP address (e.g., the source IP address is within the protected network), the process 600 proceeds to 606 where the management module selectively transmits an alert indicating a potential lateral/internal attack on the network. This alert may be transmitted to a user device (e.g., a network analyst's computing device, etc.), a database for future evaluation, etc.

If, however, the source IP address is external to the protected network and identified as a public IP address (e.g., 11.12.13.14), the process 600 proceeds to 608. At 608, the management module determines if the possible malicious traffic is targeting an open port or interface of a network device (e.g., the server 106 of FIGS. 1 and 2). The open port or interface may refer to, for example, a port or interface that is permitted to receive traffic from a private IP address, as specified by a firewall policy. If yes at 608, the management module selectively transmits an alert indicating a potential external attack on the network at 610. This external attack alert may be transmitted to a network analyst's computing device, a database for future evaluation, etc. as explained above.

If the management module determines that the possible malicious traffic is not targeting an open port or interface of the network device at 608, the management module selectively transmits the alert indicating a potential lateral/internal attack on the network at 606. A no determination at 608 may indicate, for example, a network device or a termination point between a firewall and the network security module has been taken over by an attacker. In such examples, the attacker may mask a private IP address of the network device or termination point with a public IP address.

For example, the management module may determine the source IP address 11.12.13.14 of possible malicious traffic is a public IP address in 604. If the destination point (e.g., port 80 of the server 106) of the attack is blocked (e.g., not open) from receiving traffic from a public IP address due to the firewall policy, the management module may determine the possible malicious traffic is not targeting an open port of the server 106 at 608, and transmit an alert indicating a possible lateral/internal attack on the network at 606.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A network intrusion system for a protected network, the network intrusion system comprising:
 at least one memory, wherein the memory stores instructions; and
 at least one processor configured to execute the instructions and cause the network intrusion system to perform,
  receiving a rule describing a set of associated network vulnerabilities;
  determining whether there is a match between any of the set of associated network vulnerabilities and a set of cumulative vulnerabilities present in at least one of a plurality of network devices in the protected network; and
  in response to determining that there is no match, transmitting a command signal to a network security processor, wherein the command signal instructs the network security processor to disable the rule.

2. The network intrusion system of claim 1, wherein the command signal is a first command signal, wherein the at least one processor is configured to execute the instructions and cause the network intrusion system to perform, in response to determining that there is a match between any of the set of associated network vulnerabilities and the set of cumulative vulnerabilities, transmitting a second command signal to the network security processor, and wherein the second command signal instructs the network security processor to enable the rule.

3. The network intrusion system of claim 1, wherein the determining whether there is a match between any of the set of associated network vulnerabilities and the set of cumulative vulnerabilities includes determining whether an intersection of the set of associated network vulnerabilities and the set of cumulative vulnerabilities is an empty set, and wherein the transmitting the command signal includes transmitting the command signal to the network security processor in response to determining that the intersection is the empty set.

4. The network intrusion system of claim 1 further comprising the network security processor, wherein the network security processor is configured to inspect network traffic to the protected network according to a plurality of rules.

5. The network intrusion system of claim 4 wherein the network security processor is configured to remove the disabled rule from the plurality of rules corresponding to the command signal.

6. The network intrusion system of claim 4 wherein the network security processor is configured to receive a definition for each of the plurality of rules from a distribution server external to the protected network.

7. The network intrusion system of claim 4 wherein the network security processor includes at least one of an intrusion detection system (IDS) and an intrusion prevention system (IPS).

8. The network intrusion system of claim 1 wherein the at least one processor includes the network security processor.

9. The network intrusion system of claim 1 wherein the at least one processor is configured to execute the instructions and cause the network intrusion system to perform:
receiving a first alert indicating suspect network traffic;
determining a source IP address associated with the suspect network traffic;
in response to the source IP address being within the protected network, transmitting a second alert indicating a potential internal attack; and
in response to the source IP address being external to the protected network, transmitting a third alert indicating a potential external attack.

10. The network intrusion system of claim 1 wherein the at least one processor is configured to execute the instructions and cause the network intrusion system to perform:
receiving a firewall policy associated with a firewall that is configured to control access to the protected network;
in response to determining that there is a match between any of the set of associated network vulnerabilities and the set of cumulative vulnerabilities, determining affected devices from the plurality of network devices, determining a traffic signature of the rule, comparing the traffic signature to the firewall policy; and
in response to the firewall policy blocking traffic matching the traffic signature from reaching the affected devices, transmitting the command signal to the network security processor.

11. The network intrusion system of claim 1 wherein the at least one processor is configured to execute the instructions and cause the network intrusion system to perform:
receiving a severity value for the rule;
comparing the severity value to a severity threshold; and
in response to determining that the severity value falls below the severity threshold, transmitting the command signal to the network security processor.

12. A method of operating a network intrusion system for a protected network, the method comprising:
receiving a rule describing a set of associated network vulnerabilities;
determining whether there is a match between any of the set of associated network vulnerabilities and a set of cumulative vulnerabilities present in at least one of a plurality of network devices in the protected network; and
in response to determining that there is no match, transmitting a command signal to a network security processor, wherein the command signal instructs the network security processor to disable the rule.

13. The method of claim 12, wherein the command signal is a first command signal, wherein the method further comprises, in response to determining that there is a match between any of the set of associated network vulnerabilities and the set of cumulative vulnerabilities, transmitting a second command signal to the network security processor, and wherein the second command signal instructs the network security processor to enable the rule.

14. The method of claim 12 wherein the determining whether there is a match between any of the set of associated network vulnerabilities and the set of cumulative vulnerabilities includes determining whether an intersection of the set of associated network vulnerabilities and the set of cumulative vulnerabilities is an empty set, and wherein transmitting the command signal includes transmitting the command signal to the network security processor in response to determining that the intersection is the empty set.

15. The method of claim 12, further comprising inspecting network traffic to the protected network according to a plurality of rules.

16. The method of claim 15, further comprising removing the disabled rule from the plurality of rules corresponding to the command signal.

17. The method of claim 12, further comprising:
receiving a first alert indicating suspect network traffic;
determining a source IP address associated with the suspect network traffic;
in response to the source IP address being within the protected network, transmitting a second alert indicating a potential internal attack; and
in response to the source IP address being external to the protected network, transmitting a third alert indicating a potential external attack.

18. The method of claim 12, further comprising:
receiving a firewall policy associated with a firewall that is configured to control access to the protected network;
in response to determining that there is a match between any of the set of associated network vulnerabilities and the set of cumulative vulnerabilities, determining affected devices from the plurality of network devices, determining a traffic signature of the rule, and comparing the traffic signature to the firewall policy; and in response to the firewall policy blocking traffic matching the traffic signature from reaching the affected devices, transmitting the command signal to the network security processor.

19. The method of claim 12 further comprising:
receiving a severity value for the rule;
comparing the severity value to a severity threshold; and
in response to determining that the severity value falls below the severity threshold, transmitting the command signal to the network security processor.

20. The method of claim 12 further comprising accessing vulnerability information describing the set of cumulative vulnerabilities present in at least one of the plurality of network devices in the protected network.

* * * * *